July 11, 1939.  G. M. REIFER ET AL  2,165,652
FREIGHT CAR LOADING APPARATUS
Filed March 25, 1937   4 Sheets-Sheet 1

Inventors
George M. Reifer &
George D. Shanahan
By Blackmore, Spencer & Flink
Attorneys

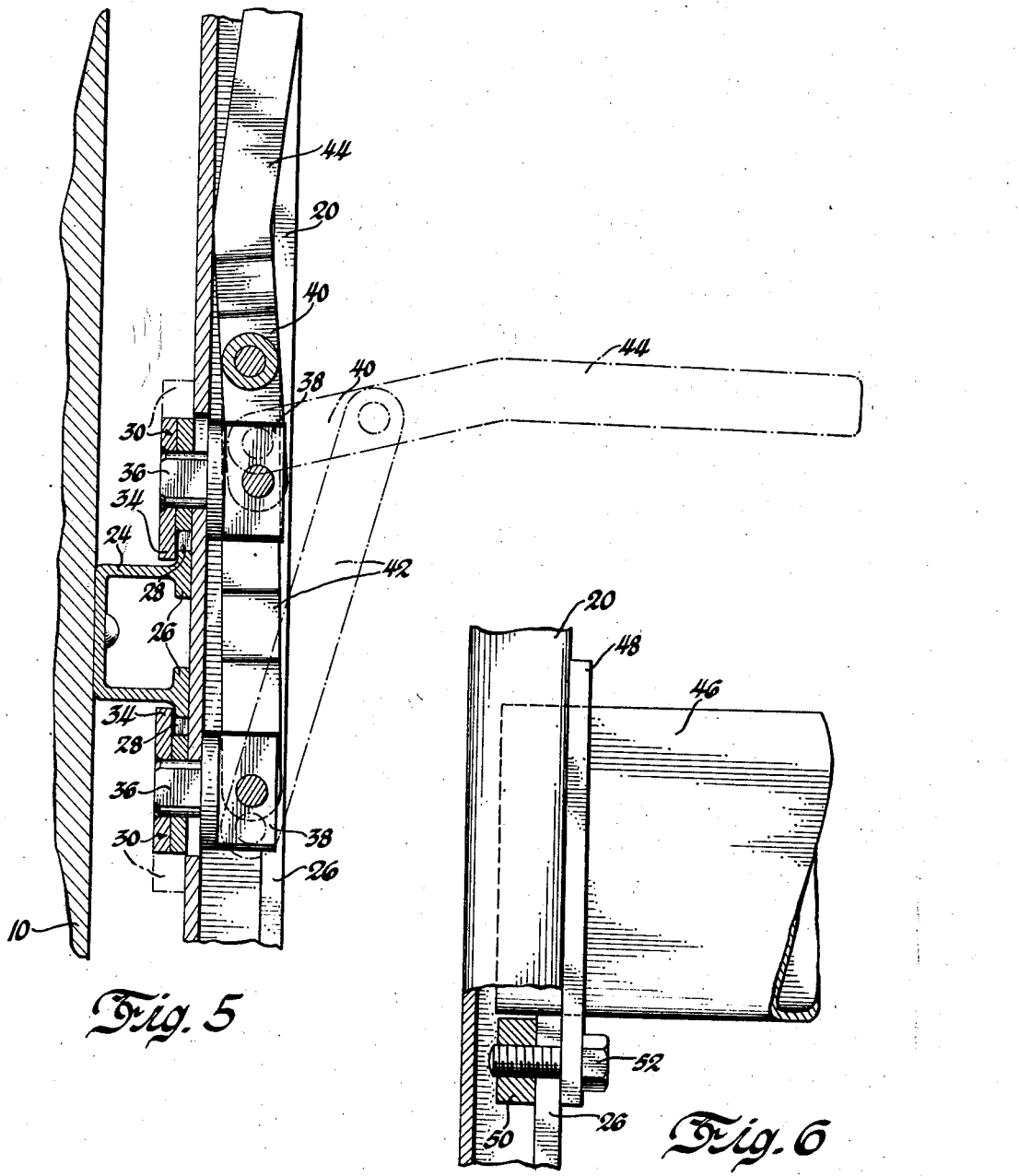

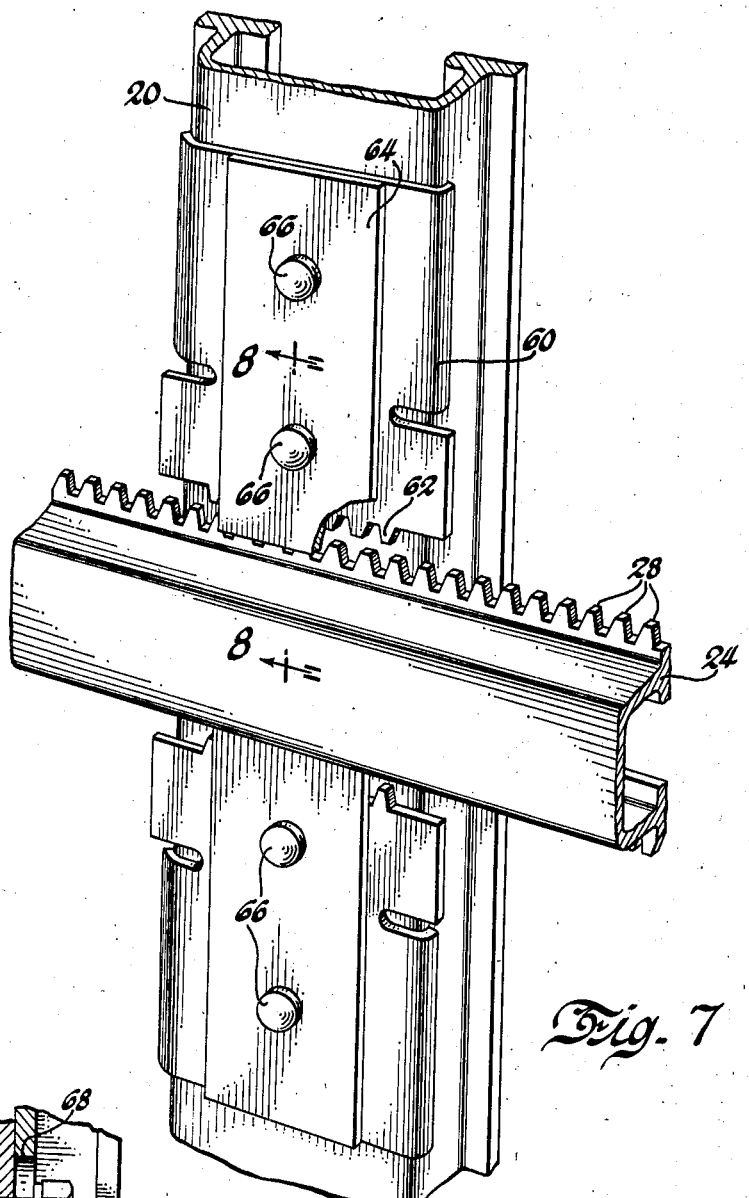
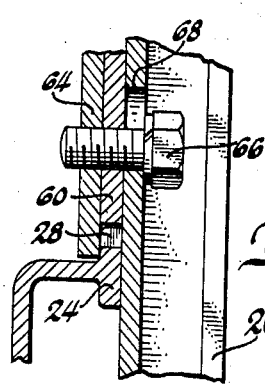

July 11, 1939.   G. M. REIFER ET AL   2,165,652
FREIGHT CAR LOADING APPARATUS
Filed March 25, 1937    4 Sheets-Sheet 4

Inventors
George M. Reifer &
George D. Shanahan
By Blackmore, Spencer & Flint
Attorneys Patented July 11, 1939

2,165,652

UNITED STATES PATENT OFFICE 2,165,652

FREIGHT CAR LOADING APPARATUS

George M. Reifer, Rochester, and George D. Shanahan, Detroit, Mich., assignors to General Motors Corporation, Detroit, Mich., a corporation of Delaware Application March 25, 1937, Serial No. 132,934

17 Claims. (Cl. 105—369)

This invention has to do with apparatus for bracing freight in box cars and like conveyances, and particularly with equipment of this type in which stanchions are mounted on guides extending along the side walls of the car to enable them to be positioned where desired along its length and in which braces are mounted for vertical adjustment on the stanchions to enable them to be positioned at the height desired to brace the freight in the car. The invention is an improvement on that disclosed in the prior Patent No. 2,122,959 granted to C. R. Scharff on July 5, 1938, and consists in the provision of improved guiding means for the lower end of the stanchion and positive locking means for locking the stanchion to the lower guide. The apparatus is simple and inexpensive to manufacture, and is at the same time very durable and adapted for standardization. It is also characterized by the absence of projecting parts which might interfere with the loading of the car or tend to catch and tear packages of freight in loading or unloading.

In the drawings:

Figure 5 is a section on line 5—5 of Figure 1.

Figure 6 is a side view showing the method of securing the brace to the stanchion.

Figure 7 is a perspective view showing a modified arrangement for locking the stanchion to the guide.

Figure 8 is a section on line 8—8 of Figure 7.

Figure 1:
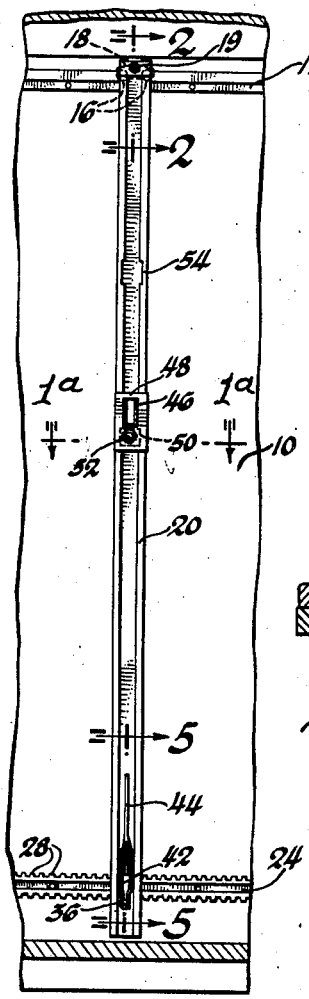
Figure 1 is a side view of part of the wall of a box car showing one of the stanchions secured in position.
Figure 2:
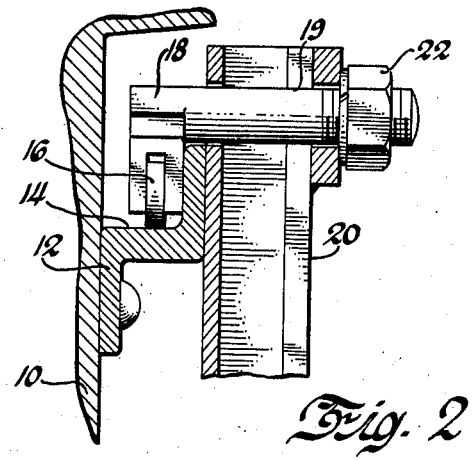
Figure 2 is a section on line 2—2 of Figure 1.
Figure 1A:
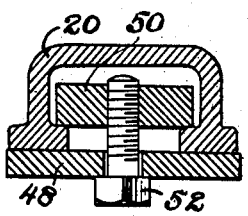
Figure 1a is a section on line 1a—1a of Figure 1.
Figure 3:
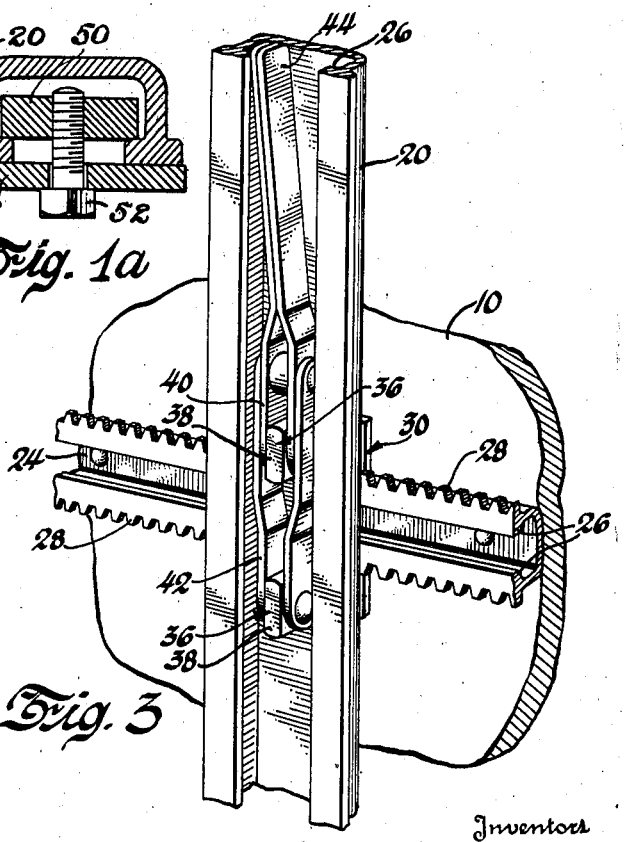
Figure 3 is a detail perspective view of the locking arrangement shown at the bottom of Figure 1.
Figure 4:
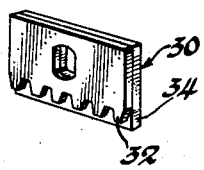
Figure 4 is a perspective view of one of the toothed clamping members carried by the stanchion.
Figure 9:
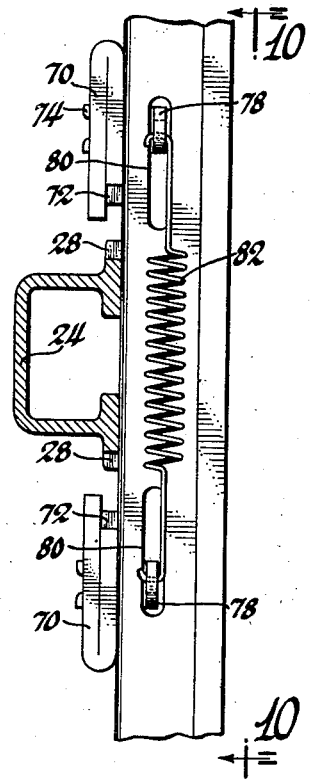
Figure 9 is a side view with the guide in section showing another form of locking means for the stanchion.

10 indicates a portion of the side wall of a freight car. Adjacent the top of the side wall is a guide 12, preferably of Z shape as shown in Figure 2, providing a trackway 14 for a pair of rollers 16 carried by a hanger 18 having a shank 19, as shown in Figure 2, passing through apertures in the channel shaped stanchion 20. Nut 22 prevents separation of the hanger from the stanchion. By this arrangement the stanchion is supported for rolling movement along the guideway 12, and when desired the nut 22 may be tightened up to clamp the stanchion to the guide.

24 indicates a guide secured adjacent the bottom of the side wall 10. The guide is preferably in the form of a channel-shaped rolled section provided with inwardly projecting flanges 26 and outwardly projecting toothed flanges 28.

Slidably mounted on the outside of the bottom wall of the stanchion 20 are clamping or locking members 30 provided with teeth 32 adapted to be moved into locking engagement with the teeth 28 and a flange portion 34 engaging the inner sides of the teeth to prevent lateral separation of the stanchion from the guide 24. The members 30 are mounted on studs 36 extending from blocks 38 to which are pivoted toggle levers 40 and 42, the first of these being extended at 44 to provide a handle.

The parts are shown in locked position in the figures, but by swinging the handle 44 to dotted line position as shown in Figure 5, the clamping and locking plates 30 may be withdrawn to the position shown in dotted lines in which the teeth 32 clear the teeth 28 and the stanchion 20 may be rolled along the guides. The stanchion is moved to a position in which it is desired to insert a brace to hold freight, and then by tightening up the nut 22 and moving the lever 44 to the full line position shown in Figure 5, the stanchion may readily be locked in place.

The stanchion is adapted to receive the ends of braces such as the metal brace shown at 46 in Figure 6. To accomplish this plate 48 is provided bearing against the inner side of the stanchion, the plate being apertured to receive the end of the brace 46. The plate is secured in position by means of a clamp 50 and bolt 52 threaded into the clamp. By tightening up the bolt the plate 48 and clamp 50 are drawn together, gripping the flanges 26 between them. The cutaway portion 54 is provided to permit removal of the clamp 50 from within the channels. This, of course, weakens the stanchion somewhat, and for that reason it is desirable to have the portion 54 near one end of the stanchion where the force exerted on the stanchion by shifting of the load is reduced.

In the modifications shown in Figures 7 and 8 the guide 24 is of the same construction, but the clamping and locking members consist of plates 60 shaped to fit the back of the stanchion and having teeth 62 on their lower ends to cooperate with the teeth on the guide. The backing plate 64 engages the rear face of the teeth 28 on the guide when in locking position. In this modification the clamping and locking members are held in place by means of screw bolts 66 threaded into apertures in members 60 and 64. The screw bolts work in slots 68 formed in the bottom of the channel stanchion, and obviously by this arrangement the clamping and locking members may be held either in locked or in unlocked position.

This construction has the advantage of simplicity and economy, but lacks some of the convenience of the preferred form.

Figure 11:
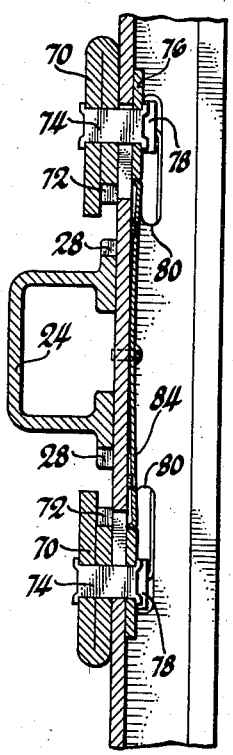
Figure 11 is a section on line 11—11 of Figure 10.
Figure 10:
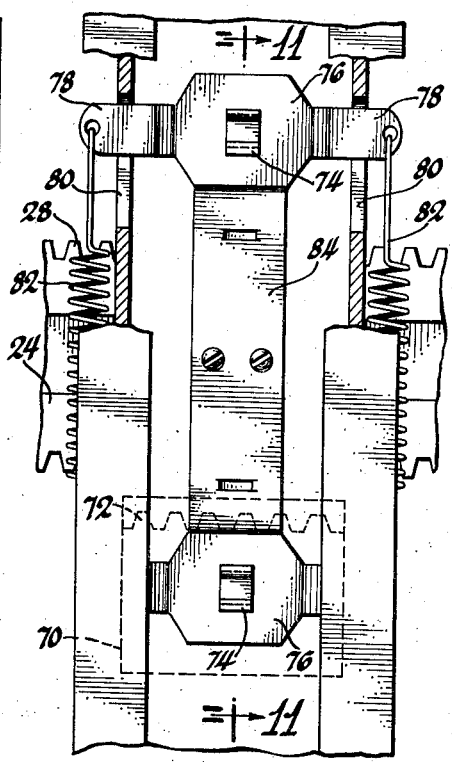
Figure 10 is a view taken on line 10—10 of Figure 9.
Figure 12:
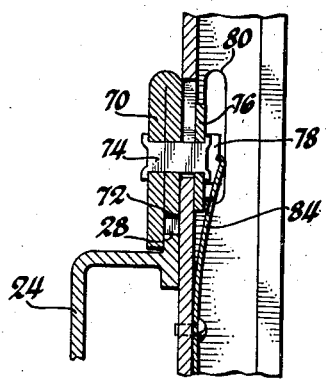
Figure 12 is a section corresponding to the upper part of Figure 11 but showing the parts in locking position.

In Figures 9 to 12 there is shown a further modification in which the clamping and locking members 70 are preferably formed by bending over a strip of sheet metal, after first forming teeth 72 on one edge of the strip. The clamping and locking member cooperates with the teeth 28 on the guide 24 in the same manner as in the other views. To each of the clamping members 70 there is secured by rivet 74 the plate 76 having reduced ends 78 projecting through slots 80 formed in the opposite legs of the stanchion. Springs 82 connect corresponding arms 78 and yieldingly tend to move the clamping and locking member 70 to locked position. 84 indicates a flat spring secured centrally to the stanchion and having its ends adapted to engage the adjacent edges of plates 76 to hold the parts in unlocked position as shown in Figure 11. The ends of the detent 84 may be readily withdrawn from latching engagement with plates 76 whereupon the springs 82 slide the members 70 to locking position as shown in Figure 12.

The described arrangement is inexpensive and affords a positive locking means to hold the stanchion where desired along the car wall.

Obviously, the invention is capable of considerable modification. Thus the same kind of locking means used to hold the bottom of the stanchion to the lower guide might be employed to hold the plate 48 to the stanchion, thus providing a positive lock instead of the friction grip afforded by the clamp 50. Likewise the same locking arrangement could, if desired, be employed at the upper end of the stanchion as well as at the lower end. This would, however, necessitate the employment of a more expensive guide at the top. Obviously, also, in place of having the teeth 28 on the outer flanges of the channel guide 24 they could, if desired, be formed on the inner flanges with a corresponding rearrangement of the locking members. However, this is not as desirable because it would require a larger guide rail or rails.

The invention is obviously applicable to the method of securing freight in various vehicles, although it has been especially designed for railway use.

Where the terms such as "top", and "bottom" and the like have been used in the specification, it is understood they are used in a relative sense only, and not in an absolute sense.

We claim:

1. In load bracing apparatus for box cars the combination of a guide extending longitudinally of the side of the car, a stanchion, spaced clamps mounted on the stanchion and adapted to be positioned on opposite sides of the guide, said clamps being so constructed and arranged as to be movable toward or from each other along the stanchion so as to grip the guide between them and means for holding the clamps in locking engagement with the guide.

2. In load bracing apparatus for box cars the combination of a guide extending longitudinally of the side of the car, a stanchion, spaced clamps mounted on the stanchion and adapted to be positioned on opposite sides of the guide, said clamps being so constructed and arranged as to be movable toward or from each other along the stanchion so as to grip the guide between them, means for holding the clamps in locking engagement with the guide, said stanchion being of channel shape with the clamps mounted on the back of the channel.

3. In load bracing apparatus for box cars the combination of a guide extending longitudinally of the side of the car, a stanchion, spaced clamps movably mounted on the stanchion and adapted to be positioned on opposite sides of the guide, and common operating means mounted on the stanchion for simultaneously moving the clamps to locking position.

4. In load bracing apparatus for box cars the combination of a guide extending longitudinally of the side of the car, a stanchion, spaced clamps movably mounted on the stanchion and adapted to be positioned on opposite sides of the guide, common operating means mounted on the stanchion for simultaneously moving the clamps to locking position, said stanchion being of channel shape with the clamps mounted on the back of the channel and the common operating means lying within the channel and having clamp engaging parts extending through slots in the back thereof.

5. In load bracing apparatus for box cars the combination of a guide extending longitudinally of the side of the car, a stanchion, spaced clamps mounted on the stanchion and adapted to be positioned on opposite sides of the guide, said clamps being so constructed and arranged as to be movable toward or from each other along the stanchion so as to grip the guide between them, means for holding the clamps in locking engagement with the guide, said clamps and guide being provided with teeth on their engaging portions adapted to be clamped in mesh with each other.

6. In load bracing apparatus for box cars the combination of a guide extending longitudinally of the side of the car, a stanchion, spaced clamps movably mounted on the stanchion and adapted to be positioned on opposite sides of the guide, and a toggle mounted on the stanchion for simultaneously moving the clamps to locking position.

7. The combination of a guide extending longitudinally of the car wall having oppositely extending flanges spaced from the car, a stanchion, spaced members movably mounted on the stanchion and having portions adapted to be moved to embrace the flanges to prevent separation of the stanchion from the guide both laterally and longitudinally, said guide and members being provided with teeth adapted to intermesh to positively lock the stanchion against movement longitudinally of the guide, and toggle mechanism for simultaneously moving the members to locking position.

8. In load bracing apparatus for box cars the combination of spaced parallel guides secured to a wall of the car, a stanchion mounted on said guides, one of said guides having oppositely facing teeth thereon, toothed members on said stanchion, each adapted to engage one of the sets of teeth on the guide but normally out of contact therewith, and means for simultaneously producing relative movement of the teeth on the stanchion with respect to the teeth on the guide to cause the teeth to interlock and hold the stanchion against displacement.

9. In load bracing apparatus for box cars and the like the combination of spaced parallel guides secured to a wall of the car, a stanchion mounted on said guides, one of said guides having oppositely facing teeth thereon, toothed members on said stanchion arranged on opposite sides of said last-named guide, and common operating means for simultaneously moving the toothed members into engagement with the teeth on the guide to hold the stanchion against displacement.

10. In the combination as defined in claim 9, the stanchion being of channeled section and the said operating means being housed within the channel.

11. In load bracing apparatus for box cars and the like the combination of spaced parallel guides secured to a wall of the car, a stanchion mounted on said guides, one of said guides being in the form of an outwardly facing channel provided with teeth on opposed legs thereof, movable teeth carried by the stanchion and arranged on opposite sides of said teeth on the channel, and means for simultaneously moving the teeth on the stanchion into locking engagement with the teeth on the guide to hold the stanchion against movement longitudinally, and means associated with said teeth on the stanchion and movable therewith to engage the rear faces of teeth on the guide to prevent movement of the stanchion transversely of said guide.

12. In load bracing apparatus for box cars and the like the combination of spaced parallel horizontal guides secured along the wall of a car, one of said guides providing a track, a stanchion, a roller mounted on the stanchion and engaging the track to support the stanchion, the other guide being provided with oppositely facing teeth thereon, toothed members on the stanchion adapted to engage the teeth on the other guide, and means for simultaneously producing relative movement of the teeth on the stanchion with respect to the teeth on the other guide to bring them into engagement with the teeth on the guide.

13. In load bracing apparatus for box cars and the like the combination of spaced parallel horizontal guides secured along the wall of the car, one of said guides providing a track, a stanchion, a roller mounted on the stanchion and engaging the track to support the stanchion, means for clamping the stanchion to the said guide, the other guide being provided with oppositely facing teeth thereon, toothed members on the stanchion adapted to engage the teeth on the other guide, and means for simultaneously producing relative movement of the teeth on the stanchion with respect to the teeth on the other guide to bring them into engagement with each other to hold the stanchion against displacement.

14. In load bracing apparatus for box cars the combination of a guide extending along a car wall and provided with flanges spaced from each other and from the car wall and parallel to said wall, a stanchion engaging said flanges, clamping members on said stanchion having portions engaging behind said flanges when in clamping position to prevent lateral separation of the stanchion from the guide, said clamping members being adjustable toward each other so as to grip the guide between them, and means for locking the members in gripping engagement with the guide.

15. In the combination as defined in claim 14, said flanges having oppositely facing teeth thereon, and said clamping members having teeth arranged between the said flange engaging portions and the stanchion adapted to interlock with the teeth on the guide when the parts are in gripping engagement.

16. In load bracing apparatus for box cars the combination of a channel-shaped guide having its base secured to the car wall and provided with flanges extending outwardly from the sides of the channel and parallel to the car wall, a stanchion engaging the said flanges, clamping members on said stanchion having portions engaging behind said flanges when in clamping position to prevent lateral separation of the stanchion from the guide, said clamp members being adjustable toward each other so as to grip the guide between them, and means for locking the members in gripping engagement with the guide.

17. In the combination as defined in claim 16, one of said flanges having teeth thereon, and the corresponding clamping member having teeth thereon arranged between the said flange engaging portions and the stanchion adapted to interlock with the teeth on the flange when the parts are in gripping engagement.

GEORGE M. REIFER.
GEORGE D. SHANAHAN.